United States Patent
Ishii et al.

(10) Patent No.: US 11,183,823 B2
(45) Date of Patent: Nov. 23, 2021

(54) ELECTRIC JUNCTION BOX UNIT

(71) Applicant: Yazaki Corporation, Tokyo (JP)

(72) Inventors: Kimihiro Ishii, Makinohara (JP); Joji Tanaka, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 17/036,410

(22) Filed: Sep. 29, 2020

(65) Prior Publication Data

US 2021/0098978 A1  Apr. 1, 2021

(30) Foreign Application Priority Data

Sep. 30, 2019 (JP) .............................. JP2019-179430

(51) Int. Cl.
*H02G 3/08* (2006.01)
*B60R 16/023* (2006.01)

(52) U.S. Cl.
CPC ......... *H02G 3/081* (2013.01); *B60R 16/0238* (2013.01)

(58) Field of Classification Search
CPC .......... H02G 3/08; H02G 3/081; H02G 3/088; H02G 3/14; H02G 3/083; H02G 3/16; H05K 5/00; H05K 5/0004; H05K 5/0091; H05K 5/0217; H05K 5/0204; B60R 16/02; B60R 16/0239; B60R 16/0238; H01R 9/2458; H01R 9/24; H01R 2201/26
USPC ........... 174/50, 520, 17 R, 535; 220/3.2–3.9, 220/4.02; 439/76.1, 76.2, 949; 361/600, 361/601, 622, 641, 837, 605
See application file for complete search history.

(56) References Cited

U.S. PATENT DOCUMENTS

| | | | | |
|---|---|---|---|---|
| 6,833,503 B2 * | 12/2004 | Lopez | ................. | B60R 16/0238 174/50 |
| 7,903,395 B2 * | 3/2011 | Nishida | ................ | H05K 5/0073 361/679.01 |
| 8,157,116 B2 * | 4/2012 | Ejima | ................ | B60R 16/0238 174/58 |
| 8,931,653 B2 * | 1/2015 | Kita | ......................... | H02G 3/08 439/76.1 |
| 9,203,221 B2 * | 12/2015 | Kamigaichi | ............. | H02G 3/08 |
| 9,231,330 B2 * | 1/2016 | Tashiro | ................ | H01R 13/502 |
| 2012/0119041 A1 | 5/2012 | Ikehata | | |

FOREIGN PATENT DOCUMENTS

JP  2010-268601 A  11/2010

* cited by examiner

*Primary Examiner* — Angel R Estrada
(74) *Attorney, Agent, or Firm* — Banner & Witcoff, Ltd.

(57) ABSTRACT

An electric junction box unit includes an electric junction box, a bracket holding the electric junction box, and a holder assembled to the bracket. The bracket includes a plate-shaped back face portion facing the electric junction box, a plurality of holding portions which are erected from the back face portion along an assembly direction of the electric junction box and which hold the electric junction box, and an engaging recessed portion engaging with the holder in a state where the back face portion is sandwiched between the electric junction box and the holder. The engaging recessed portion includes a first recessed portion receiving a first engaging piece of the holder along a direction intersecting the assembly direction, and a second recessed portion receiving a second engaging piece of the holder along the assembly direction.

4 Claims, 6 Drawing Sheets

ELECTRIC JUNCTION BOX UNIT

CROSS REFERENCE TO RELATED APPLICATIONS

This application claims priority to Japanese Patent Application No. 2019-179430 filed on Sep. 30, 2019, the entire contents of which are incorporated herein by reference.

BACKGROUND OF THE INVENTION

Field of the Invention

The present invention relates to an electric junction box unit including an electric junction box, a bracket for holding the electric junction box, and a holder assembled to the bracket.

Description of Related Art

In the related art, brackets for attaching a vehicle electric junction box to a vehicle body frame or the like have been proposed. For example, one of the brackets according to the related art includes a structure for holding an electric junction box by covering a back face and side faces of the electric junction box.
[Patent Literature 1] JP-A-2010-268601

A holder for holding peripheral devices (for example, a connector or the like) may be further assembled to the bracket described above. Here, a work space for performing such assembly work may become very narrow due to the high density of various electrical components or the like mounted on a vehicle and a positional relationship with the peripheral devices. For example, from such a background, it is desired that an electric junction box unit including an electric junction box, a bracket, and a holder can be assembled within a space as narrow as possible.

SUMMARY

An electric junction box unit includes an electric junction box, a bracket holding the electric junction box, and a holder assembled to the bracket. The bracket includes a plate-shaped back face portion facing the electric junction box, a plurality of holding portions which are erected from the back face portion along an assembly direction of the electric junction box and which hold the electric junction box, and an engaging recessed portion engaging with the holder in a state where the back face portion is sandwiched between the electric junction box and the holder. The engaging recessed portion includes a first recessed portion receiving a first engaging piece of the holder along a direction intersecting the assembly direction, and a second recessed portion receiving a second engaging piece of the holder along the assembly direction. The holder is configured to be locked to the bracket by rotating the holder about an engaging portion of the first engaging piece and the first recessed portion to insert the second engaging piece into the second recessed portion along the assembly direction, in a state where the first engaging piece is inserted into the first recessed portion along the direction intersecting the assembly direction.

BRIEF DESCRIPTION OF DRAWINGS

FIGS. 5A and 5B are cross-sectional views corresponding to an X-X cross section in FIG. 2.

FIGS. 6A and 6B are cross-sectional views corresponding to a Y-Y cross section in FIG. 2.

DESCRIPTION OF EMBODIMENTS

One Embodiment

Figure 1:
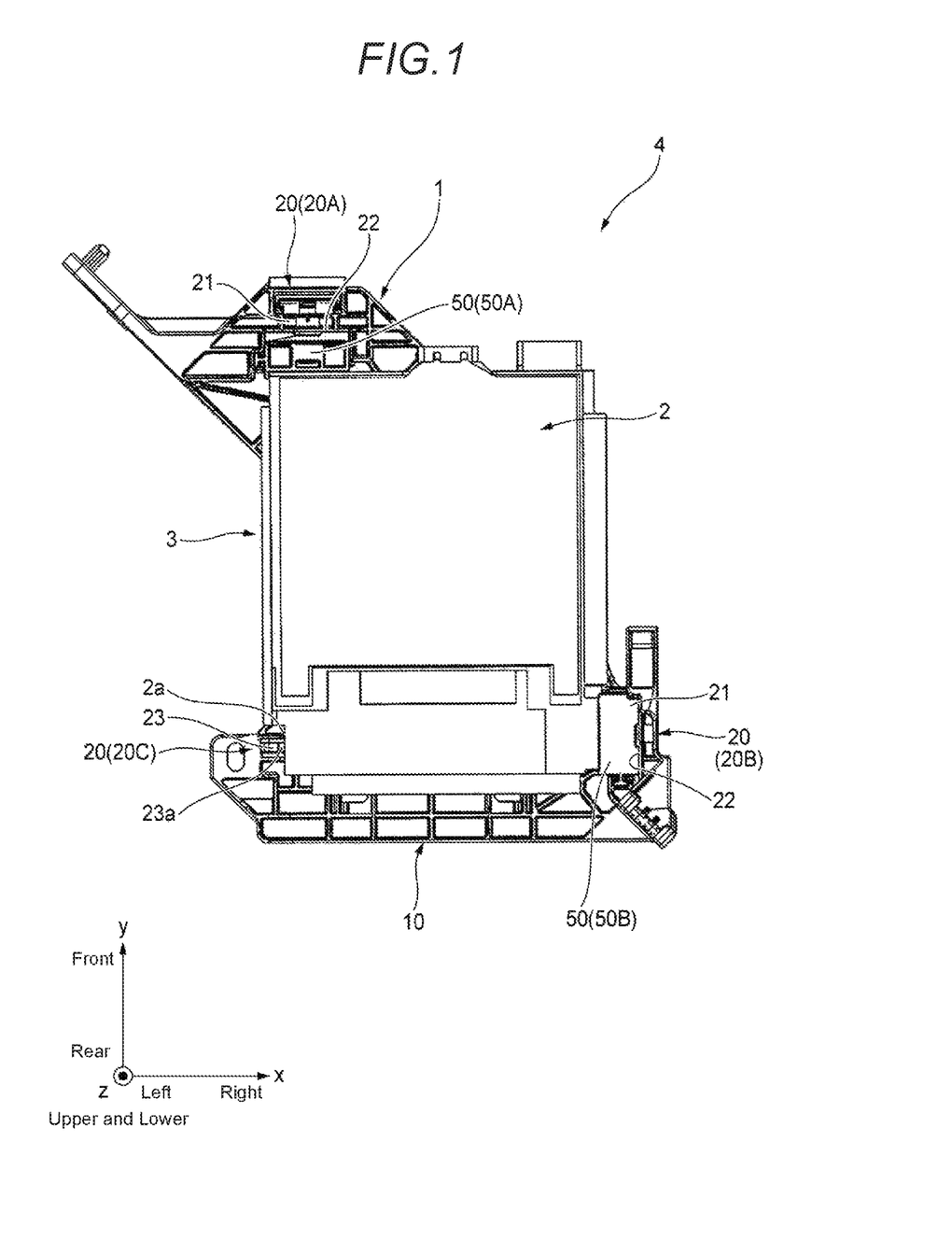
FIG. 1 is a plan view of an electric junction box unit according to an embodiment.
Figure 2:
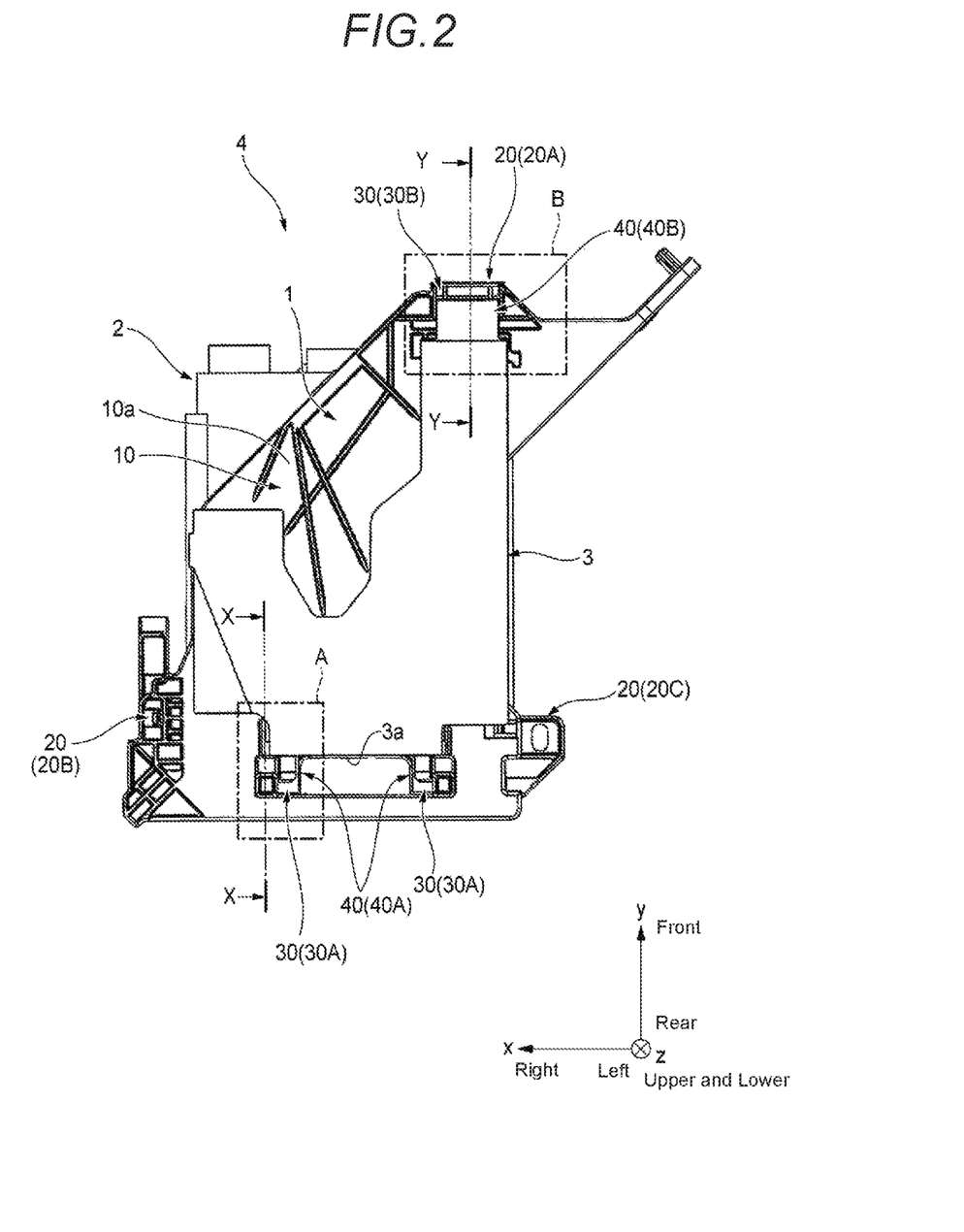
FIG. 2 is a back view of the electric junction box unit illustrated in FIG. 1.

Hereinafter, an electric junction box unit 4 according to an embodiment of the present invention will be described with reference to the drawings. As illustrated in FIGS. 1 and 2, the electric junction box unit 4 includes an electric junction box 2, a bracket 1 for holding the electric junction box 2, and a holder 3 assembled to the bracket 1. The bracket 1 is typically a component for attaching the electric junction box 2 for vehicle control to a vehicle body frame or the like. The holder 3 is typically a component for holding various devices (for example, connectors) around the bracket 1.

Hereinafter, for convenience of description, a "left-right direction" (x-axis direction), a "front-rear direction" (y-axis direction), an "upper-lower direction" (z-axis direction), "left" (x-axis negative direction), "right" (x-axis positive direction), "front" (y-axis positive direction), "rear" (y-axis negative direction), "upper side" (z-axis positive direction), and "lower side" (z-axis negative direction) are defined as illustrated in FIGS. 1 to 6B. The upper-lower direction (z-axis direction) is a direction in which the bracket 1 and the electric junction box 2 are moved to butt against each other during the assembly of the bracket 1 and the electric junction box 2, and is also referred to as an "assembly direction". The left-right direction, the front-rear direction, and the upper-lower direction are perpendicular to one another. Hereinafter, each component constituting the electric junction box unit 4 will be described in order.

First, the electric junction box 2 will be described. As illustrated in FIG. 1, the electric junction box 2 includes a housing made of resin, which has a substantially rectangular parallelepiped shape including an upper face, a back face (lower face), and four side faces. A plurality of electronic components (not illustrated) for controlling a vehicle are built in the electric junction box 2. A locking protrusion 2a protruding leftward is provided at a rear end portion of a left face (a face facing the left) among the four side faces of the electric junction box 2. The locking protrusion 2a engages with a locking protrusion 23a (described below) of a secondary holding portion 20C (described below) of the bracket 1.

Relay pieces 50 (50A, 50B) are attached to two locations on respective side faces of the electric junction box 2, respectively. In this embodiment, the relay piece 50A is attached to a left end portion of a front face (face facing the front) among the four side faces of the electric junction box 2 so as to protrude forward, and the relay piece 50B is attached to a rear end portion of a right face (face facing the right) among the four side faces of the electric junction box 2 so as to protrude rightward. The relay piece 50 is fixed to a side face of the electric junction box 2 so as not to move relative to the side face of the electric junction box 2 by a predetermined engagement structure regarding engagement between a locking protrusion 51 (see FIGS. 6A and 6B) provided on the relay piece 50 and a locking portion (not illustrated) provided on the side face of the electric connection box 2.

The relay piece 50 is made of a material (typically, a resin material) having an elastic modulus smaller than that of a resin material constituting a base material of the bracket 1. In this embodiment, the relay pieces 50A and 50B have the same shape. The operation and effects obtained by providing the relay pieces 50 will be described below.

Next, the bracket 1 will be described. The bracket 1 is a resin molded product. As illustrated in FIGS. 1 and 2, the bracket 1 includes a back face portion 10 having a substantially flat plate shape, a plurality of holding portions 20 (main holding portions 20A and 20B, and the secondary holding portion 20C to be described below) erected upward from the back face portion 10, and a plurality of engaging recessed portions 30 (a first recessed portion 30A and a second recessed portion 30B to be described below) that are to be engaged with the holder 3. The back face portion 10 is a portion that abuts against the back face of the electric junction box 2. The holding portions 20 are a portion that holds a peripheral edge of the side faces of the electric junction box 2. The engaging recessed portions 30 (the first recessed portion 30A and the second recessed portion 30B) are provided on a face (back face) of the back face portion 10 on a side opposite to the electric junction box 2 (see FIG. 2), and are portions that engage with engaging pieces 40 (a first engaging piece 40A and a second engaging piece 40B), which will be described below, of the holder 3.

In this embodiment, as the plurality of holding portions 20, main holding portions 20A and 20B respectively provided at positions corresponding to the relay pieces 50A and 50B attached to the electric junction box 2, and the secondary holding portion 20C provided at a position corresponding to the locking protrusion 2a (see FIG. 1) of the electric junction box 2 are provided. The secondary holding portion 20C is separated from the main holding portions 20A and 20B.

Figure 6A:
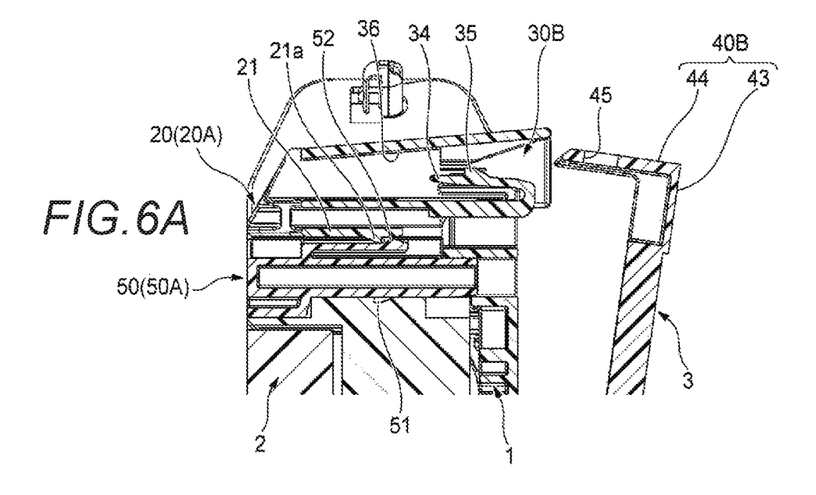
FIG. 6A illustrates a state in which the holder is rotated and a second engaging piece of the holder is to be inserted into a second recessed portion of the bracket.

As illustrated in FIGS. 1 and 6A, each of the main holding portions 20A and 20B includes a support piece 21 that is integrally connected to the back face portion 10 and erected upward from the back face portion 10. On a face of the support piece 21, which faces the side face of the electric junction box 2, a recessed portion 22 for accommodating and holding the relay piece 50 attached to the electric junction box 2 is formed.

Specifically, as illustrated in FIG. 1, the recessed portion 22 of the main holding portion 20A is formed on a rear face (face facing the rear) of the support piece 21 of the main holding portion 20A and is a substantially rectangular parallelepiped recess for accommodating the substantially rectangular parallelepiped relay piece 50A. The recessed portion 22 is recessed forward, extends in the upper-lower direction (assembly direction), and opens rearward and upward. The recessed portion 22 of the main holding portion 20B is formed on a left face (face facing the left) of the support piece 21 of the main holding portion 20B and is a substantially rectangular parallelepiped recess for accommodating the substantially rectangular parallelepiped relay piece 50B. The recessed portion 22 is recessed rightward, extends in the upper-lower direction (assembly direction), and opens leftward and upward.

As illustrated in FIG. 1, the secondary holding portion 20C includes a support piece 23 that is integrally connected to the back face portion 10 and erected upward from the back face portion 10. The locking protrusion 23a for holding a peripheral edge of the side face of the electric junction box 2 by engaging with the locking protrusion 2a of the electric junction box 2 is provided on a right face (face facing the right) of the support piece 23 such that the locking protrusion 23a protrudes rightward.

As illustrated in FIG. 2, in this embodiment, a pair of first recessed portions 30A provided at positions separated in the left-right direction at a rear end portion of the back face portion 10, and the second recessed portion 30B provided at a position adjacent to the front side of the main holding portion 20A at a front end portion of the back face portion 10 are provided as the plurality of engaging recessed portions 30.

Figure 3A:
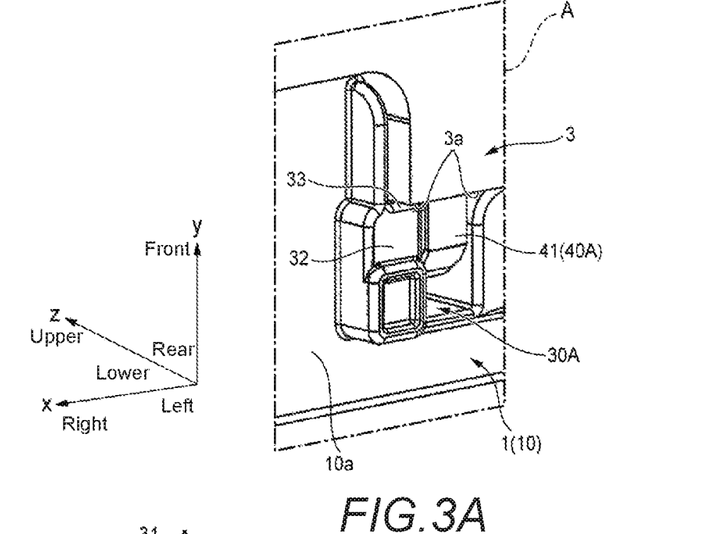
FIG. 3A is an enlarged perspective view of a part A in FIG. 2.
Figure 3B:
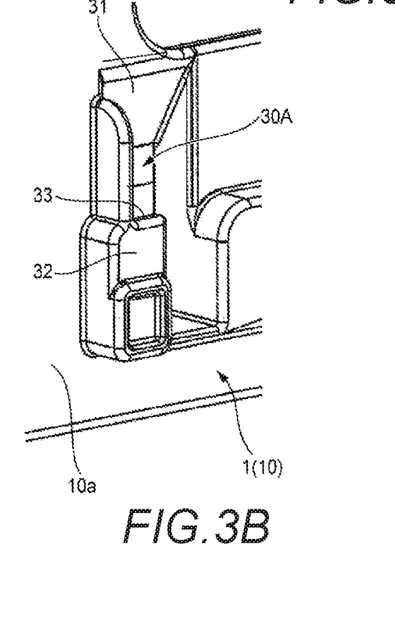
FIG. 3B is a perspective view illustrating only a bracket in FIG. 3A.

As shown in FIGS. 2, 3A, and 3B, each of the pair of first recessed portions 30A is a portion recessed upward from the back face 10a of the back face portion 10 and has a rectangular shape extending in the front-rear direction. The pair of first recessed portions 30A can respectively receive the pair of first engaging pieces 40A, which will be described below, of the holder 3 from the front to the rear in the front-rear direction, and respectively engage with the pair of first engaging pieces 40A (also see FIGS. 5A and 5B). Since the pair of first recessed portions 30A are bilaterally symmetrical, only the first recessed portion 30A on one side (left side in FIG. 2) will be described below.

As illustrated in FIG. 3B, a front inner wall of the first recessed portion 30A is inclined, in a direction in which the first engaging piece 40A moves upward as moving rearward, relative to the back face 10a of the back face portion 10 (also see FIGS. 5A and 5B), and functions as a first guide wall 31 for guiding the first engaging piece 40A into the first recessed portion 30A. A canopy portion 32 extending leftward is provided on a rear region of a right opening edge, extending in the front-rear direction, of the first recessed portion 30A so as to partially cover a right rear region of the first recessed portion 30A. The canopy portion 32 is provided at a position protruding downward from the back face 10a of the back face portion 10 by an amount corresponding to the plate thickness of the holder 3 (see FIGS. 5A and 5B).

Figure 4A:
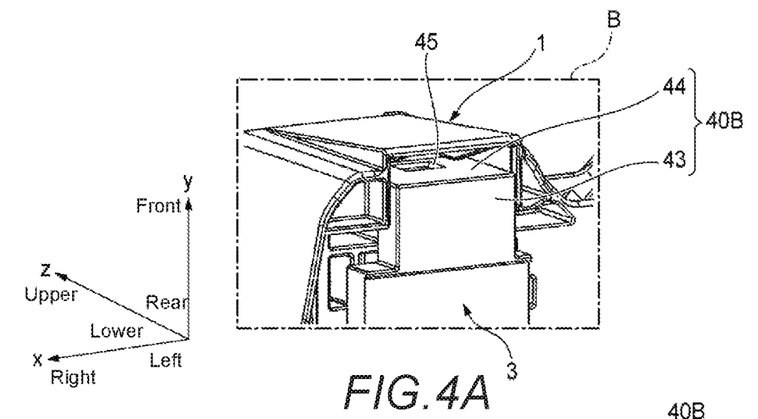
FIG. 4A is an enlarged perspective view of a part B in FIG. 2.
Figure 4B:
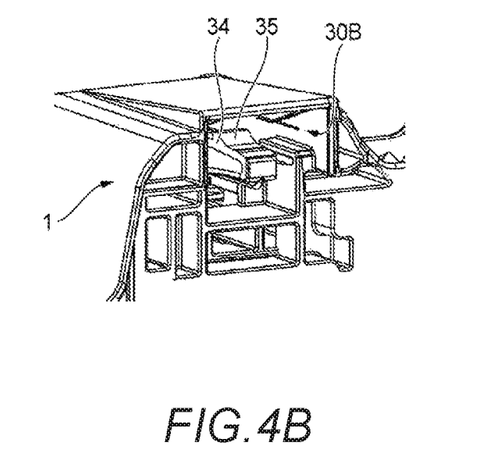
FIG. 4B is a perspective view illustrating only a bracket in FIG. 4A.

As illustrated in FIGS. 2, 4A and 4B, the second recessed portion 30B is a portion recessed upward from the back face 10a of the back face portion 10 and has a rectangular shape extending in the left-right direction. The second recessed portion 30B can receive the second engaging piece 40B, which will be described below, of the holder 3 from below to above along the upper-lower direction (assembly direction), and engages with the second engaging piece 40B (also see FIGS. 6A and 6B).

Figure 6B:
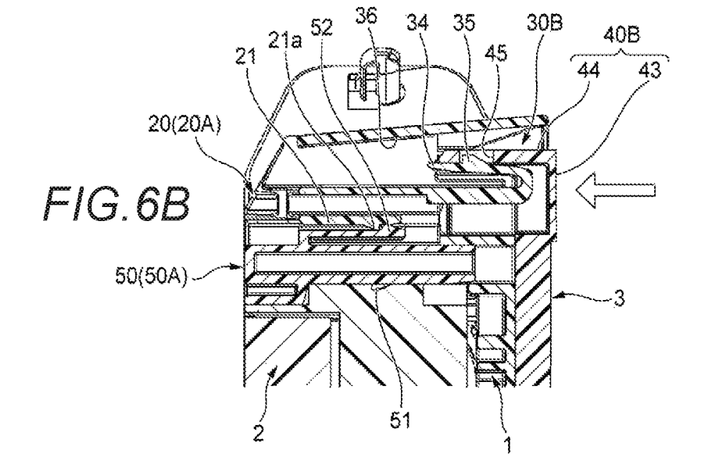
FIG. 6B illustrates a state in which the second engaging piece is inserted into the second recessed portion and assembly of the holder to the bracket is completed.

As illustrated in FIGS. 4B, 6A, and 6B, a locking piece 34 extending upward in a cantilever shape and elastically deformable in the front-rear direction is formed inside the second recessed portion 30B. A locking protrusion 35 protruding forward is formed on a front side surface of the locking piece 34. The locking protrusion 35 engages with a locking hole 45 (see FIG. 4C), which will be described below, of the second engaging piece 40B of the holder 3.

Next, the holder 3 will be described. The holder 3 is a resin molded product. As illustrated in FIG. 2, the holder 3 has a substantially flat plate shape as a whole. A plurality of holding portions (not illustrated) for holding connectors or the like connected to peripheral devices can be provided on a face (back face) of the holder 3 on a side opposite to the electric junction box 2. The holder 3 can hold the connectors or the like connected to the peripheral devices by using the plurality of holding portions.

The holder 3 includes a plurality of engaging pieces 40 (the first engaging piece 40A and the second engaging piece 40B) for engaging with a plurality of engaging recessed portions 30 (the first recessed portion 30A and the second recessed portion 30B) of the bracket 1. In this embodiment, as the plurality of engaging pieces 40, a pair of first engaging pieces 40A provided at positions corresponding to the pair of first recessed portions 30A and the second engaging piece 40B provided at a position corresponding to the second recessed portion 30B are provided.

Figure 3C:
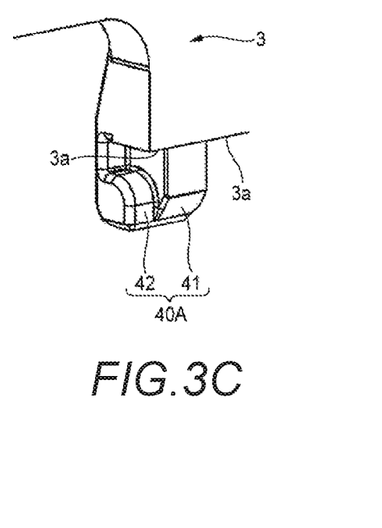
FIG. 3C is a perspective view illustrating only a holder in FIG. 3A.

As illustrated in FIGS. 2, 3A and 3C, each of the pair of first engaging pieces 40A is a protruding piece protruding rearward from a predetermined rear end face 3a of the holder 3. Since the pair of first engaging pieces 40A are bilaterally symmetrical, only the first engaging piece 40A on one side (left side in FIG. 2) will be described below.

As illustrated in FIG. 3C, the first engaging piece 40A integrally includes a first portion 41 continuously extending rearward from the rear end face 3a of the holder 3, and a second portion 42 protruding rightward from a rear end portion (distal end portion) of a right side face of the first portion 41. The second portion 42 is located in a manner of separating downward from the rear end face 3a of the holder 3.

Figure 4C:
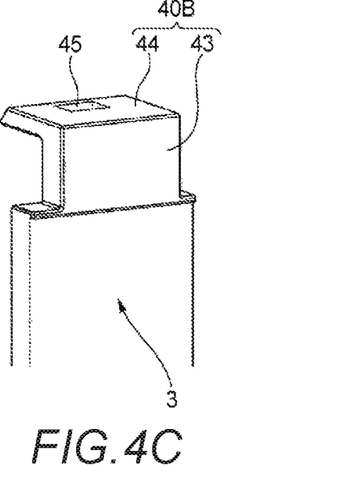
FIG. 4C is a perspective view illustrating only a holder in FIG. 4A.

As illustrated in FIGS. 2, 4A and 4C, the second engaging piece 40B includes a first portion 43 extending forward from a predetermined front end face 3b of the holder 3, and a second portion 44 having a rectangular flat plate shape, which extends upward from a front end portion (distal end portion) of the first portion 43. The locking hole 45 penetrating in the front-rear direction is formed in a central portion of the second portion 44. Each component constituting the electric junction box unit 4 has been described above.

Next, assembly of the electric junction box unit 4 will be described. First, the electric junction box 2 is attached to the bracket 1. Therefore, the relay pieces 50 (50A, 50B) are attached to the side faces of the electric junction box 2 (see FIG. 1). Next, the electric junction box 2 approaches the back face portion 10 of the bracket 1 along the upper-lower direction (assembly direction) such that the electric junction box 2 is disposed above the bracket 1, the relay piece 50A enters the recessed portion 22 of the main holding portion 20A, the relay piece 50B enters the recessed portion 22 of the main holding portion 20B, and the right face of the support piece 23 of the secondary holding portion 20C is in face-to-face contact (slide) with a side face around the locking protrusion 2a of the electric junction box 2.

In a state in which the back face of the electric junction box 2 abuts against the back face portion 10 of the bracket 1, a locking protrusion 52 provided on each of the relay pieces 50 engages with a locking protrusion 21a provided on the support piece 21 of each of the main holding portions 20 (20A, 20B) as illustrated in FIGS. 6A and 6B, and further, the locking protrusion 2a of the electric junction box 2 engages with the locking protrusion 23a of the secondary holding portion 20C (see FIG. 1). As a result, the electric junction box 2 is held at three locations on the peripheral edges of the side faces of the electric junction box 2 by the three holding portions 20, i.e., two main holding portions 20A and 20B, and one secondary holding portion 20C, of the bracket 1, and is sandwiched in a direction perpendicular to the side face of the electric junction box 2, so that the electric junction box 2 is prevented from coming off from the bracket 1. Thus, the attachment of the electric junction box 2 to the bracket 1 is completed.

A force of pressing a side face (front face) of the electric junction box 2 rearward via the relay piece 50A by the main holding portion 20A is transmitted to an inner wall face (specifically, a face facing the front) of the recessed portion 22 of the main holding portion 20B and is received by the inner wall face via the relay piece 50B fixed to the electric junction box 2. A force of pressing a side face (right face) of the electric junction box 2 leftward via the relay piece 50B by the main holding portion 20B is transmitted to the right face of the support piece 23 of the secondary holding portion 20C and is received by the right face via the electric junction box 2. As a result, the electric junction box 2 can be reliably held so as not to move relative to the bracket 1.

Figure 5A:
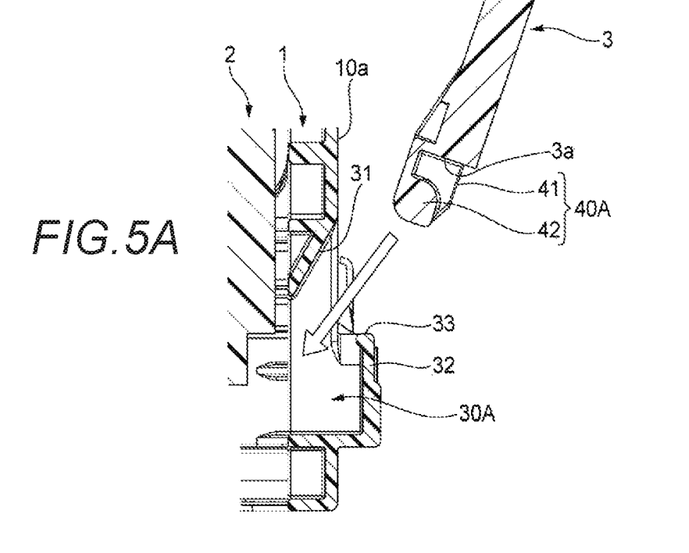
FIG. 5A illustrates a state in which a first engaging piece of a holder is to be inserted into a first recessed portion of a bracket.

When the attachment of the electric junction box 2 to the bracket 1 is completed, the holder 3 is then attached to the bracket 1. First, as illustrated in FIG. 5A, in a state where the holder 3 is inclined such that the rear side of the holder 3 is located above the front side thereof, the pair of first engaging pieces 40A of the holder 3 are respectively inserted into the pair of first recessed portions 30A of the bracket 1 from front to rear along the front-rear direction while sliding on a surface of the first guide wall 31. This insertion is continued until the rear end face 3a of the holder 3 abuts against a front end face 33 (see FIGS. 3B and 5B) of the canopy portion 32.

As a result, it is possible to obtain a state where the second portion 42 of the first engaging piece 40A enters an upper side of the canopy portion 32 of the first recessed portion 30A, and the first portion 41 of the first engaging piece 40A is sandwiched in the left-right direction by the canopy portion 32 and the side wall of the first recessed portion 30A.

Figure 5B:
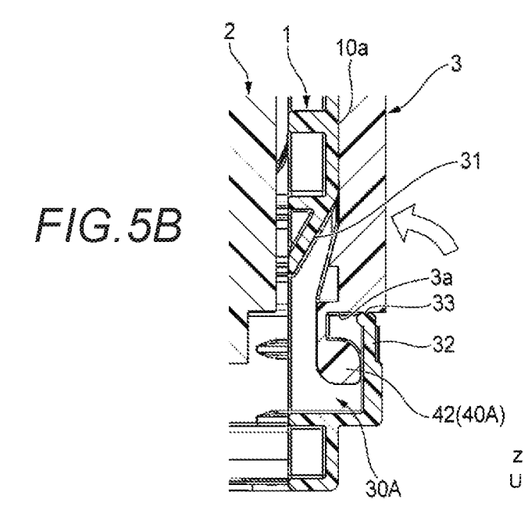
FIG. 5B illustrates a state in which the holder is rotated about an engaging portion of the first engaging piece and the first recessed portion after inserting the first engaging piece into the first recessed portion.

Next, as illustrated in FIG. 5B, the holder 3 is rotated about an engaging portion of the pair of first engaging pieces 40A and the pair of first recessed portions 30A. Accordingly, as illustrated in FIGS. 6A and 6B, the second portion 44 of the second engaging piece 40B is inserted into the second recessed portion 30B along the upper-lower direction (assembly direction). At this time, the second engaging piece 40B (particularly, the second portion 44) of the holder 3 is guided toward the inside of the hole of the second recessed portion 30B by contacting a surface of a second guide wall 36. This insertion is continued until the locking hole 45 of the second engaging piece 40B is locked to the locking protrusion 35 of the second recessed portion 30B (see FIG. 6B). Thus, the attachment of the holder 3 to the bracket 1 is completed, and the assembly of the electric junction box unit 4 is completed.

In the assembled state of the electric junction box unit 4, as illustrated in FIG. 3A, the first portion 41 of the first engaging piece 40A is sandwiched in the left-right direction by the canopy portion 32 of the first recessed portion 30A and the side wall of the first recessed portion 30A, so that movement, in the left-right direction, of the rear end portion of the holder 3 relative to the bracket 1 is restricted. The second portion 42 of the first engaging piece 40A enters the upper side of the canopy portion 32, so that movement, in the upper-lower direction (assembly direction), of the rear end portion of the holder 3 relative to the bracket 1 is restricted.

Further, as illustrated in FIGS. 4A and 6B, the locking hole 45 of the second engaging piece 40B is locked to the locking protrusion 35 of the second recessed portion 30B, so that movement in the left-right direction and the upper-lower direction (assembly directions), of the front end portion of the holder 3 relative to the bracket 1 is restricted.

According to the electric junction box unit 4 of the embodiment of the present invention as described above, after the pair of first engaging pieces 40A of the holder 3 are inserted into the pair of first recessed portions 30A of the bracket 1 along the front-rear direction (a direction intersecting the assembly direction), the holder 3 is rotated about the engaging portion of the pair of first engaging pieces 40A and the pair of first recessed portions 30A, and thus, the second engaging piece 40B of the holder 3 is inserted into the second recessed portion 30B of the bracket 1 along the upper-lower direction (assembly direction). Accordingly, the holder 3 engages with the bracket 1. Therefore, the space required for assembly can be reduced as compared with the case where the holder 3 is assembled to the bracket 1 in parallel in the upper-lower direction (assembly direction). The electric junction box unit 4 according to the present embodiment can be assembled in a narrow space.

According to the electric junction box unit 4, the first guide wall 31 for guiding the first engaging piece 40A is provided inside the first recessed portion 30A. The first engaging piece 40A can be easily inserted into the first recessed portion 30A. Since the first guide wall 31 is provided between the electric junction box 2 and the first engaging piece 40A, the contact between the first engaging piece 40A and the electric junction box 2 can be prevented. After inserting the first engaging piece 40A into the first recessed portion 30A, the second engaging piece 40B can be easily inserted into the second recessed portion 30B by the second guide wall 36 for guiding the second engaging piece 40B into the second recessed portion 30B.

According to the electric junction box unit 4, the second recessed portion 30B is provided at a position, which is adjacent to the main holding portion 20A for the bracket 1 to hold the electric junction box 2. Therefore, a wall portion between the main holding portion 20A and the second recessed portion 30B is shared by the main holding portion 20A and the second recessed portion 30B, so that the wall portion is sandwiched between the electric junction box 2 and the holder 3. Accordingly, deformation that the wall portion falls over can be prevented, and the wall portion can be thinned. The electric junction box unit 4 can be miniaturized because the wall portion is thin. The first recessed portions 30A are provided at positions adjacent to each of the main holding portion 20B and the secondary holding portion 20C. As a result, the structure of the bracket 1 can be further streamlined overall.

Another Embodiments

The present invention is not limited to the above embodiment and various modifications can be adopted within the scope of the present invention. For example, the present invention is not limited to the embodiment described above and may be appropriately modified, improved or the like. Materials, shapes, sizes, numbers, arrangement positions, and the like of constituent elements in the embodiment described above are optional as long as the present invention can be achieved, and the present invention is not limited thereto.

In the above embodiment, the relay piece 50 is sandwiched between the support piece 21 of the main holding portion 20 and the side face of the electric junction box 2. In contrast, the relay piece 50 may not be sandwiched. In this case, it is preferable that a protruding portion having a shape identical to the shape of the relay piece 50 is integrally provided on a side face of the housing of the electric junction box 2.

In the above embodiment, the front inner wall of the first recessed portion 30A is inclined relative to the back face 10a of the back face portion 10, and functions as the first guide wall 31 for guiding the first engaging piece 40A into the first recessed portion 30A. In contrast, the front inner wall of the first recessed portion 30A may extend perpendicular to the back face 10a of the back face portion 10 similarly to other inner walls of the first recessed portion 30A.

In the above embodiment, the second recessed portion 30B of the bracket 1 is provided at a position adjacent to the main holding portion 20A of the bracket 1. In contrast, the second recessed portion 30B of the bracket 1 may not be provided at the position adjacent to the main holding portion 20A of the bracket 1.

Here, the characteristics of the embodiment of the electric junction box unit 4 according to the present invention described above are summarized briefly in the following [1] to [4].

[1] An electric junction box unit (4) comprising:
an electric junction box (2);
a bracket (1) holding the electric junction box (2); and
a holder (3) assembled to the bracket (1),
wherein the bracket (1) includes:
   a plate-shaped back face portion (10) facing the electric junction box (2);
   a plurality of holding portions (20) which are erected from the back face portion (10) along an assembly direction of the electric junction box (2) and which hold the electric junction box (2); and
   an engaging recessed portion (30) engaging with the holder (3) in a state where the back face portion (10) is sandwiched between the electric junction box (2) and the holder (3),
wherein the engaging recessed portion (30) includes:
   a first recessed portion (30A) receiving a first engaging piece (40A) of the holder (3) along a direction intersecting the assembly direction; and
   a second recessed portion (30B) receiving a second engaging piece (40B) of the holder (3) along the assembly direction, and
wherein the holder (3) is configured to be locked to the bracket (1) by rotating the holder (3) about an engaging portion of the first engaging piece (40A) and the first recessed portion (30A) to insert the second engaging piece (40B) into the second recessed portion (30B) along the assembly direction, in a state where the first engaging piece (40A) is inserted into the first recessed portion (30A) along the direction intersecting the assembly direction.

[2] The electric junction box unit (4) according to [1],
wherein the bracket (1) includes:
   a first guide wall (31) which is located between the electric junction box (2) and the first engaging piece (40A) and which extends along the direction intersecting the assembly direction and is configured to guide the first engaging piece (40A) into the first recessed portion (30A); and a second guide wall (36) which extends along the assembly direction and is configured to guide the second engaging piece (40B) into the second recessed portion (30B).

[3] The electric junction box unit (4) according to [1] or [2], wherein the second recessed portion (30B) is located adjacent to one holding portion (20A) of the plurality of holding portions (20).

[4] The electric junction box unit (4) according to [3], wherein the first recessed portions (30A) is located adjacent to other holding portions (20B, 20C) of the plurality of holding portions (20).

According to the aspect [1], the holder is configured to be locked to the bracket by rotating the holder about an engaging portion of the first engaging piece and the first recessed portion to insert the second engaging piece into the second recessed portion along the assembly direction, after the first engaging piece is inserted into the first recessed portion along the direction intersecting the assembly direction. For example, the space required for assembling the holder and the bracket can be reduced as compared with the case where the holder is assembled while moving along the assembly direction (parallel) with respect to the bracket. Particularly, when inserting the first engaging piece of the holder into the first recess portion, if the "direction crossing the assembling direction" is closer to the direction orthogonal to the "assembling direction" (intersection angle is 90°), the space required for assembling the holder and the bracket can be saved. Therefore, the unit of this configuration can be assembled with components even in a narrow space.

According to the aspect [2], the first engaging piece can be easily inserted into the first recessed portion by the first guide wall for guiding the first engaging piece into the first recessed portion even in a case where the first engaging piece is inserted into the first recessed portion along the direction intersecting the assembly direction (particularly, in a state where an intersection angle is large). Since the first guide wall is provided between the electric junction box and the first engaging piece, unintentional contact of the first engagement piece with the electric junction box can be prevented. After inserting the first engaging piece into the first recessed portion, the second engaging piece can be easily inserted into the second recessed portion by the second guide wall for guiding the second engaging piece into the second recessed portion.

According to the aspect [3], the second recessed portion for the bracket to engage with the holder is provided at a position adjacent to one of the holding portions for the bracket to hold the electric junction box. Therefore, for example, an inner wall of the bracket between the holding portion and the second recessed portion is shared by the holding portion and the second recessed portion, and the inner wall is sandwiched between the holding portion and the second recessed portion, so that the deformation in which the inner wall is pushed by the holding portion or the second recessed portion and falls can be prevented. Therefore, the inner wall of the bracket can be made thinner than in the case where the second recessed portion is provided at another position. As a result, the electric junction box unit can be miniaturized because the inner wall of the bracket is thin. Miniaturization of the electric junction box unit not only contributes to ensuring the space required for assembly but also can increase the convenience of the electric junction box unit.

According to the aspect [4], the first recessed portion for the bracket to engage with the holder is provided at a position adjacent to another one of the holding portions for the bracket to hold the electric junction box. As a result, the structure of the bracket can be further streamlined overall.

According to one or more embodiments, it is possible to provide an electric junction box unit whose constituent components can be assembled even in a narrow space.

What is claimed is:

1. An electric junction box unit comprising:
   an electric junction box;
   a bracket holding the electric junction box; and
   a holder assembled to the bracket,
   wherein the bracket includes:
      a plate-shaped back face portion facing the electric junction box;
      a plurality of holding portions which are erected from the back face portion along an assembly direction of the electric junction box and which hold the electric junction box; and
      an engaging recessed portion engaging with the holder in a state where the back face portion is sandwiched between the electric junction box and the holder,
   wherein the engaging recessed portion includes:
      a first recessed portion receiving a first engaging piece of the holder along a direction intersecting the assembly direction; and
      a second recessed portion receiving a second engaging piece of the holder along the assembly direction, and
   wherein the holder is configured to be locked to the bracket by rotating the holder about an engaging portion of the first engaging piece and the first recessed portion to insert the second engaging piece into the second recessed portion along the assembly direction, in a state where the first engaging piece is inserted into the first recessed portion along the direction intersecting the assembly direction.

2. The electric junction box unit according to claim 1, wherein the bracket includes:
   a first guide wall which is located between the electric junction box and the first engaging piece and which extends along the direction intersecting the assembly direction and is configured to guide the first engaging piece into the first recessed portion; and
   a second guide wall which extends along the assembly direction and is configured to guide the second engaging piece into the second recessed portion.

3. The electric junction box unit according to claim 1, wherein the second recessed portion is located adjacent to one holding portion of the plurality of holding portions.

4. The electric junction box unit according to claim 3, wherein the first recessed portion is located adjacent to other holding portions of the plurality of holding portions.

* * * * *